(12) United States Patent
Yamada

(10) Patent No.: US 6,282,387 B1
(45) Date of Patent: Aug. 28, 2001

(54) IMAGE FORMING APPARATUS

(75) Inventor: Ayako Yamada, Yokohama (JP)

(73) Assignee: Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/537,511

(22) Filed: Mar. 29, 2000

(51) Int. Cl.$^7$ .................................................. G03G 15/00
(52) U.S. Cl. ................................................ 399/75; 399/43
(58) Field of Search ................................ 399/75, 38, 388, 399/397, 43; 271/288

(56) References Cited

U.S. PATENT DOCUMENTS 4,914,485 * 4/1990 Emori et al. ........................ 355/313
5,309,204 * 5/1994 Sato et al. ........................... 355/233

* cited by examiner

Primary Examiner—Sophia S. Chen
(74) Attorney, Agent, or Firm—Foley & Lardner

(57) ABSTRACT

A variety of motors employed in the main body of an image forming apparatus are controlled in accordance with operating times which are other than those of the motors of the main body and which are exemplified by the operating time of the finisher coupled to the image forming apparatus. Owing to this control, the operating speed of the printing processing need not be lowered, and unnecessary idle operations of the motors are prevented. Accordingly, consumables, such as a photosensitive drum driven by the main motor, do not deteriorate in a short period of time.

12 Claims, 5 Drawing Sheets

IMAGE FORMING APPARATUS

BACKGROUND OF THE INVENTION

The present invention relates to an image forming apparatus, such as a complex-type digital copying machine that can be provided with option units, an example of which is a finisher.

There is a conventional digital copying machine that can be provided with option units, an example of which is a finisher. In this type of digital copying machine, the operation of the main body of the digital copying machine is controlled in accordance with the processing speed of the finisher. For example, at the start of a copying operation, the main body of the digital copying machine is made to stand by until the end of the operation of the finisher, such as the operation of initialization or the operation of changing the sheet discharge bin position for use in the copying process. In the standby state, the main motor (drum motor) and other motors employed in the main body of the digital copying machine are kept rotating.

If the print start request that uses a different sheet discharge bin from the one used last is made (i.e., when the copy button is depressed, the printer-mode printing is requested, the facsimile-mode printing is requested, or the like), the conventional digital copying machine to which the finisher is connected first rotates the motors, including the main motor, and then requests that the finisher move the sheet discharge bins.

As can be seen from this, movement of the bins of the finisher is started when the motors are rotating. A sheet supplied from a sheet feed cassette is made to stop immediately in front of the register rollers and waits for the finisher to complete the movement of the bins. Thereafter, the sheet is fed to the image formation section. While the sheet is waiting for the completion of the bin movement, the motors keep rotating in an idle manner.

When printing operations are executed successively, there may be a new print request, and this printing will uses a different sheet discharge bin from the presently used one. Even in this case, the bins are moved, with the motors rotating. The supplied sheet waits for the completion of the bin movement immediately in front of the register rollers, and is then fed to the image formation section.

When the bin presently in use becomes replete with stacked sheets, the sheet discharge bins are moved. In this case as well, the bins are moved, with the motors rotating in the idle manner. That is, the supplied sheet waits for the completion of the bin movement in front of the register rollers, and is then fed to the image formation section.

In the case where the bin moving distance of the finisher is long or the bin moving speed is low, the time required for the bin movement is inevitably long. Hence, the motors of the main body of the digital copying machine have to rotate in the idle manner. This being so, consumables driven by the motors, such as a photosensitive drum, deteriorate in a short period of time.

BRIEF SUMMARY OF THE INVENTION

The present invention is intended to solve the problem that an image forming apparatus performs unnecessary operations, which are caused by operations other than the image forming operation, and that the deterioration of the consumables thereof are accelerated, accordingly. According to the present invention, the unnecessary operations of an image forming apparatus, which are due to operations other than the image forming operation, are reduced, and the deterioration of the consumables are therefore suppressed.

An image forming apparatus of the present invention comprises: sheet feed means for feeding an image formation medium; image forming means for forming an image on the image formation medium fed by the sheet feeding means; discharge means for discharging the image formation medium on which the image is formed by the image formation means; and control means for controlling timings at which an operation of the image forming means is started, when image formation processing is executed by the image forming means, in such a manner that the timings are controlled in accordance with a first time required for operations other than the operation of the image forming means and a second time required for starting up the image forming means.

Another image forming apparatus according to the present invention comprises: sheet feed means for feeding an image formation medium; image forming means for forming an image on the image formation medium fed by the sheet feeding means; discharge means including a plurality of sheet discharge bins to which the image formation medium bearing the image formed by the image forming means is selectively discharged on the basis of settings regarding image formation processing; determination means for determining whether or not the sheet discharge bins to which image forming medium is discharged are switched from one to another, when the image formation processing is executed by the image forming means; and control means for controlling timings at which an operation of the image forming means is started, in such a manner that the timings are controlled in accordance with a first time, a second time and a third time when the determination means determines that the sheet discharge bins are switched from one to another, the first time being a time required for the discharge means to switch the sheet discharge bins, the second time being a time required for starting up the image forming means, and the third time being a time required for the sheet feed means to feed the image formation medium.

An image forming method according to the present invention is for use in an image forming apparatus comprising: sheet feed means for feeding an image formation medium; image forming means for forming an image on the image formation medium fed by the sheet feeding means; and discharge means for discharging the image formation medium on which the image is formed by the image formation means. The method is featured in that timings at which an operation of the image forming means is started are controlled when image formation processing is executed by the image forming means, in such a manner that the timings are controlled in accordance with a first time required for operations other than the operation of the image forming means and a second time required for starting up the image forming means.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

An embodiment of the present invention will now be described with reference to the accompanying drawings.

Figure 1:
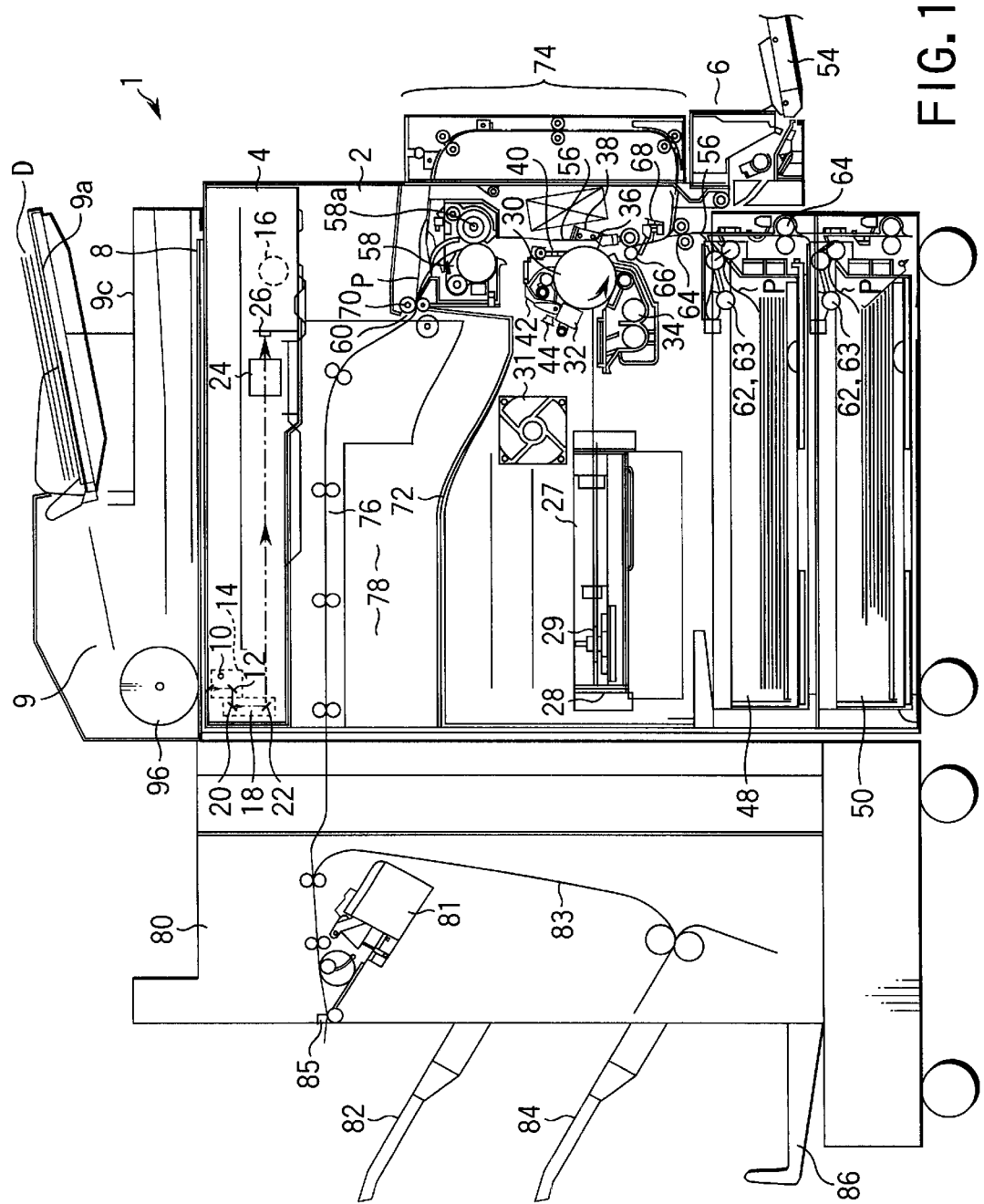
FIG. 1 is a sectional view showing the schematic structure of a digital copying machine, which embodies an image forming apparatus according to the present invention.

FIG. 1 is a sectional view showing the schematic structure of a digital copying machine 1, which is an example of an image forming apparatus of the present invention.

As shown in FIG. 1, the digital copying machine 1 is provided with a main body 2. A scanner section 4 serving as a reading means and a printer section 6 serving as an image forming means are arranged inside the main body 2.

A document table 8, on which an object to be read (i.e., a document D) is placed and which is made of a transparent glass plate, is provided for the upper surface of the main body 2. An automatic document feeder (hereinafter referred to as an ADF) 9 is arranged on the upper surface of the main body 2, so as to automatically feed documents D to the document table 8.

The documents D placed on the document tray 9a of the ADF 9 are conveyed by a conveyance guide (not shown) and then discharged onto a discharge tray 9c by a platen roller 9b. When the documents D are being conveyed by the platen roller 9b, an image is read from them by executing an exposure scan by an exposure lamp 10 provided for the scanner section 4 (which will be described later).

The documents D are placed on the document tray 9a of the ADF 9, with the sides to be read being turned upward. They are sequentially fed one by one, beginning with the uppermost one.

The scanner section 4 arranged in the main body 2 is provided with: the exposure lamp 10 which serves as a light source for illuminating either a document D conveyed by the ADF 9 or a document D placed on the document table 8, and which is made of a halogen lamp, for example; and a first mirror 12 which deflects the reflected light from the document D in a predetermined direction. The exposure lamp 10 and the first mirror 12 are mounted on a first carriage 14 located under the document table 8.

The first carriage 14 is movable in parallel to the document table 8. It is moved back and forth in the region under the document table 8 by means of a toothed belt driven by a scanner motor (a driving motor) 16. The scanner motor 16 is a stepping motor, for example.

A second carriage 18 movable in parallel to the document table 8 is arranged under the document table 8. A second mirror 20 and a third mirror 22, which are for sequentially deflecting the light reflected by the document D and deflected thereto by the first mirror 12, are attached to the second carriage 18 in such a manner that they are orthogonal to each other. The torque of the scanner motor 16 is transmitted to the second carriage 18 through the toothed belt with which the first carriage 14 is driven or through some other suitable means. The second carriage 18 is moved in such a manner as to follow the first carriage 14, and is moved in parallel to the document table 8 at a speed half that of the first carriage 14.

An image-forming lens 24, which focuses the reflected light from the third mirror 20 on the second carriage 18, and a CCD sensor (a line sensor) 26, which receives the reflected light focused by the image-forming lens 24 and photoelectrically converts it, are arranged under the document table 8. The image-forming lens 24 can be moved by a driving mechanism in a plan that includes the optical axis of the light deflected by the third mirror 22. Due to the movement of the image-forming lens 24, the reflected light is focused at a desirable optical power (in the main scan direction). In accordance with image processing clocks supplied from a system CPU (to be described later), the CCD sensor 26 photoelectrically converts the reflected light incident thereon, and then outputs electric signals corresponding to the read document D. The power in the sub-scan direction can be varied by changing the feeding speed of the ADF 9 or the moving speed of the first carriage 14.

When the document D fed by the ADF 9 is read, the position to which light is radiated from the exposure lamp 10 is the fixed position shown in FIG. 1. When the document D placed on the document table 8 is read, the position to which light is radiated from the exposure lamp 10 is moved from left to right along the document table 8.

The printer section 6 is provided with a laser exposure device 27, which functions as a latent image forming means. The laser exposure device 27 is made up of a semiconductor laser 28, and a polygonal mirror 29 for guiding a laser beam from the semiconductor laser 28 to a photosensitive drum 30. The laser beam emitted from the laser exposure device 27 is scanned over the circumferential surface of the photosensitive drum 30, thereby forming an electrostatic latent image on the circumferential surface of the photosensitive drum 30.

The printer section 6 is provided with the rotatable photosensitive drum 30, and this drum serves as an image-bearing member located in the substantially central right region inside the main body 2. The circumferential surface of the photosensitive drum 30 is exposed to a laser beam emitted from the laser exposure device 28, thereby forming a desired electrostatic latent image. Arranged around the circumferential surface of the photosensitive drum 30 are: an electric charger 32 for electrically charging the drum circumference to have a predetermined charging characteristic; a developing unit 34 which serves as a developing means and develops the electrostatic latent image formed on the circumference of the photosensitive drum 30 at a desirable image density by supplying toner, i.e., a developing agent, to that image; and a separation charger 36 for separating image formation mediums (copy sheets) fed from cassettes 48 and 50 (to be described later) from the photosensitive drum 30. These structural members constitute an integral one-body structure. Also arranged around the photosensitive drum 30 are: a transfer charger 38 for transferring a toner image formed on the photosensitive drum 30 onto a sheet P; a separation claw 40 for separating the copy sheet P from the circumference of the photosensitive drum 30; a cleaning device 42 for removing the residual toner from the circumference of the photosensitive drum 30; and an electrical discharge unit 44 for electrically discharging the circumference of the photosensitive drum 30. These structural members are arranged in the order mentioned. The photosensitive drum 30, a developing roller (not shown) arranged in the developing unit 34, etc. are rotated by a main motor 31.

In the lower region inside the main body 2, an upper cassette 48 and a lower cassette 50 are stacked one upon the other. Each of these cassettes can be drawn out from inside the main body 2. Copy sheets P different in size are stored in the respective cassettes 48 and 50. A manual insertion tray 54 is provided at one side of the upper cassette 48.

A sheet feed path 56 is defined inside the main body 2. The sheet feed path 56 extends from the cassettes 48 and 50 through a transfer section, which is located between the photosensitive drum 30 and the transfer charger 38. A fixing unit 58 is arranged at the terminating end of the sheet feed path 56. A discharge port 60 is formed in the upper portion of the fixing unit 58.

A feed roller 62 and a separation roller 63 are arranged in the neighborhood of each of the upper and lower cassettes 48 and 50. By these rollers, the sheets P are taken out from each of the cassettes 48 and 50 one by one. A large number of pairs of feed rollers 64 are provided along the sheet feed path 56 so that the copy sheets P taken out by the feed and separation rollers 62 and 63 can be fed along the sheet feed path 56.

The sheet feed path 56 is provided with a pair of register rollers 66 located upstream of the photosensitive drum 30. By means of the register rollers 66, a skew of the taken-out copy sheet P is corrected, and the front end of the toner image on the photosensitive drum 30 and the leading edge of the copy sheet P are controlled to agree with each other. Then, the copy sheet P is supplied to the transfer section at the same speed as the peripheral moving speed of the photosensitive drum 30. A pre-aligning sensor (a pre-registration switch) 68 for detecting the arrival of a copy sheet P is arranged immediately before the paired register rollers, i.e., on that side of the register rollers 64 which is closer to the feed rollers 64.

Copy sheets P, taken out one by one from the cassettes 48 and 50 by the feed rollers 62, are fed by the feed rollers 64 and supplied to the paired register rollers 66. After the leading edge of a copy sheet P is adjusted in position by the register rollers 66, it is fed to the transfer section.

In the transfer section, a developer image (i.e., a toner image) formed on the photosensitive drum 30 is transferred onto the sheet P by the transfer charger 38. After the toner image is transferred, the copy sheet P is separated from the circumference of the photosensitive drum by the separation charger 36 and the separation claw 40. Then, it is conveyed to the fixing unit 58 by a conveyance belt (not shown), which constitutes part of the sheet feed path 58. By the fixing unit 58, the developer image is melted and fixed to the copy sheet P. Then, the copy sheet P is discharged from the discharge port 60 by a pair of discharge rollers 70, and is thus fed onto a discharge tray 72.

An automatic reversing device 74 is arranged on the right side of the sheet feed path 56. The automatic reversing device 74 receives a copy sheet P when this copy sheet P has passed the fixing unit 58, reverses the copy sheet P, and then returns it to the sheet feed path 56.

A sorting lever (not shown) is arranged in the discharge port 60. By this lever, the copy sheet P discharged from the discharge port 60 is guided to either the discharge tray 72 inside the main body 2 or an externally transporting mechanism 76. The externally transporting mechanism 76 is arranged in the space 78 located above the discharge tray 72 inside the main device 2, and serves to convey the copy sheet P discharged from the discharge port 60 to a region outside of the main body 2.

Figure 2:
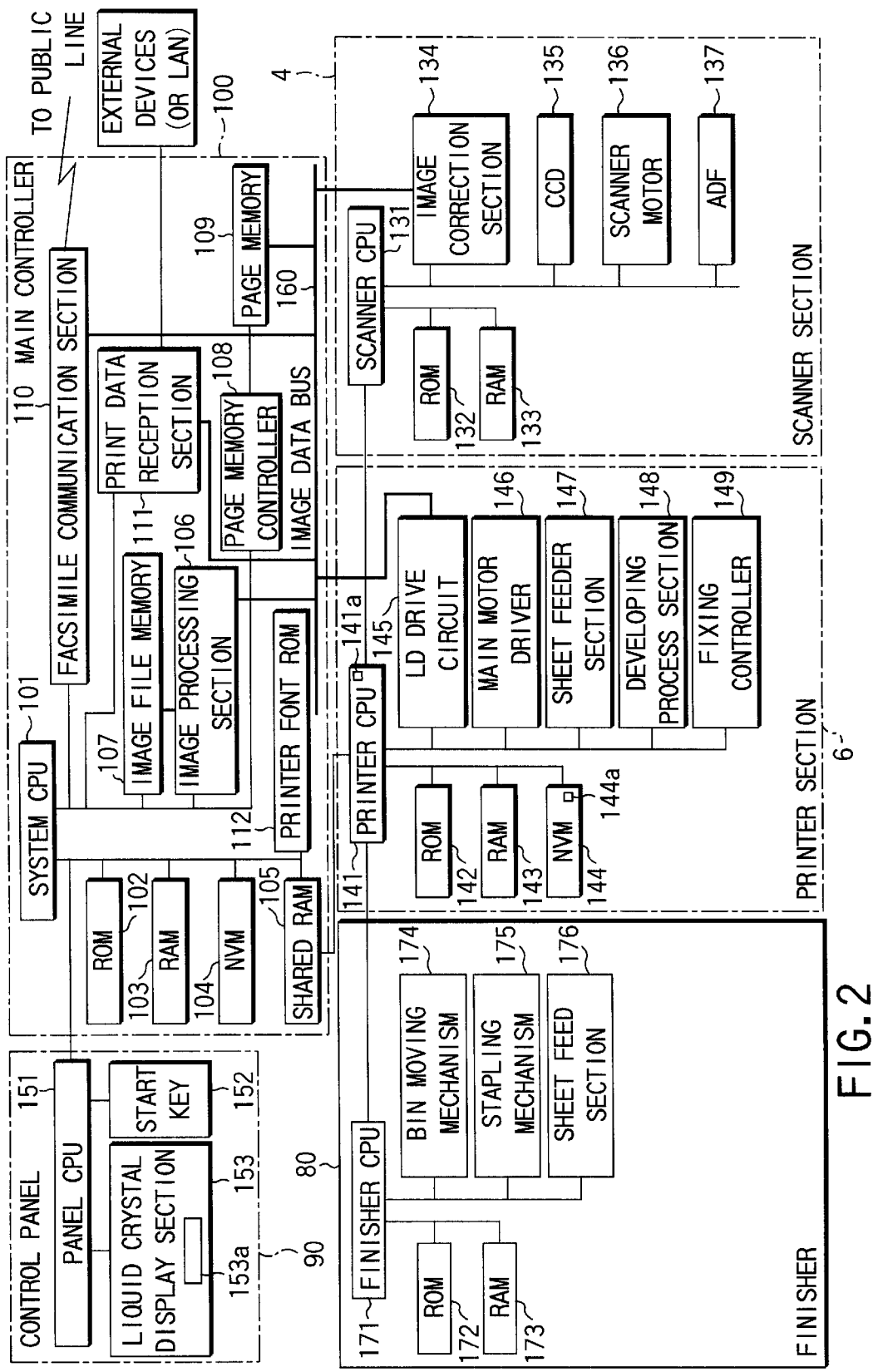
FIG. 2 is a block diagram showing the internal structure of the digital copying machine.

A finisher 80, such as that shown in FIG. 2, is coupled to one side of the main body 2. The finisher 80 serves as a sheet discharging unit and receives copy sheets P (the lower surfaces of which are printed) fed by the externally transporting mechanism 76.

In the finisher 80, a set of documents (sheets P) supplied thereto are bundled, and the rear end portions of the documents are stapled together by a stapler 81. Plural sets of documents are stacked on sheet discharge bin 82, bin 84 or bin 86. Sheet discharge bins 82 and 84 are vertically movable, and descend in accordance with the stacked state of sheets or on the basis of a the switching of a sheet discharge bin in use. Copy sheet P supplied to the finisher 80 are fed along a reversal sheet feed path 83, by which they are discharged onto the trays 83, 84 and 86, with their printed sides upward.

On the upper front portion of the main body 2, a control panel 90 (to be described later) is provided, for entering various copying conditions, such as a copy magnification, and designating the start of a copying operation.

The digital copying machine 1 may be used as a standalone machine or as a network printer.

When used as a network printer, the digital copying machine 1 is connected to external devices, such as personal computers (PC) or a server, by means of a local network (LAN).

A description will now be given of the control system of the digital copying machine 1.

A description will now be given of the control system of the digital copying machine 1.

FIG. 2 is a block diagram schematically illustrating how the structural components of the digital copying machine 1 are connected together and how signals are exchanged for control.

As shown in FIG. 2, the main body of the digital copying machine 1 comprises a main controller 100, the scanner section 4, the printer section 6, and the control panel 90. The finisher 80, which is an option unit, is connected to the digital copying machine 1.

The main controller 100 includes a system CPU 101, a ROM 102, a RAM 13, an NVM 104, a shared RAM 105, an image processing section 106, an image file memory 107, a page memory controller 108, a page memory 109, a facsimile communication section 110, a print data reception section 111, a printer font ROM 112, etc.

The system CPU 101 controls the entirety of the main controller 100. The ROM 102 stores various control programs. The RAM 103 temporarily stores data. The NVM (a nonvolatile RAM) 104 is a nonvolatile memory backed up by a battery (not shown). The shared RAM 105 is used for the mutual communication between the system CPU 101 and the printer CPU 131.

The image processing section 106 is made of an image processing circuit, for example, and executes various kinds of image processing, such as trimming, masking, image compression, and image expansion. The image processing section 106 compresses image data read by the scanner section, thereby converting them into an image file. In this manner, the image processing section 106 converts image data into an image file.

The image file memory 107 is made of a hard disk drive, for example. It records the image data, which are processed as a file by the image processing section 106. The page memory controller 108 controls the page memory 109. This page memory 109 stores the image data read by the scanner section 4 and image data to be printed by the printer section 6.

The facsimile communication section 110 transmits facsimile data to a communication line, such as a public line, and receives them from the communication line. The facsimile communication section 110 converts received facsimile data into image data, and outputs the resultant image data to the page memory 109.

The print data reception section 111 receives print data from an external device (e.g., a personal computer), which is connected thereto through a printer cable or a local area network (LAN). The printer font ROM 112 stores font data corresponding to code data, such as a character code.

The print data reception section 111 develops the print data received from the external device, on the basis of the font data stored in the front ROM 112, thereby obtaining image data. The image data are output to the page memory 109. The print data described above includes code data, such as a character code, control data for controlling the character size, resolution, etc., or bit map data.

The scanner section 4 will be described. The scanner section 4 is made up of: a scanner CPU 131, a ROM 132, a RAM 133, an image correction section 134, a CCD sensor (CCD) 135, a scanner motor 136, an auto document feeder (ADF) 137, etc.

The scanner CPU 131 controls the entirety of the scanner section 130. The ROM 132 stores control programs etc. The image correction section 134 includes a line sensor, an A/D converter circuit, a shading correction circuit, a gamma correction circuit, etc. The image correction section 134 receives image signals sent from the CCD 135. The image correction section 134 executes A/D conversion and correction with respect to the image signals it receives, and outputs the resultant data to the page memory 109. The CCD 135 is driven under the control of a CCD driver (not shown). The scanner motor 136 is provided with an exposure lamp, a mirror, etc., and drives a unit (not shown) that exposes documents to light. The ADF 137 sequentially feeds a plurality of documents to the predetermined read position.

The printer section 6 will now be described. The printer section 6 is made up of: a printer CPU 141, a ROM 142, a RAM 143, an NVM (a nonvolatile RAM) 144, an LD drive circuit, a polygonal motor 146, a sheet feeder section 147, a developing process section 148, a fixing controller 149, etc.

The printer CPU 141 controls the entirety of the printer section 6. The printer CPU 141 has a timer 141a for measuring a standby time. The ROM 142 stores control programs, etc. The NVM (NV-RAM) 144 stores various kinds of data used at the time of a copying operation, and also stores information sent from the finisher 80 or another option unit. The NVM 144 includes a storage area 144a for storing adjustment values, such as a sheet processing time. The LD drive circuit 145 controls the laser exposure device 27. The LD drive circuit 145 controls the light emission performed by the semiconductor laser 28, so as to form an electrostatic latent image on the photosensitive drum 30 (which serves as an image-bearing member). The LD drive circuit 145 controls the rotation of the polygonal mirror 29 so as to guide light from the semiconductor laser 28 to the photosensitive drum 30. A main motor driver 146 controls the rotation of the main motor 31.

The sheet feeder section 147 controls the operation of conveying sheets from each of the sheet feed stages (cassettes) 48, 50 and 54 to the finisher 80. On the basis of the operation commands from the printer CPU 141, the feed rollers 62, separation rollers 63, paired feed rollers 64, register rollers 66, paired discharge rollers 70, etc. are driven while being controlled. In this manner, the sheet feeder section 147 controls the feeding of sheets along the sheet feed path 56 and in the externally transporting mechanism 76. The sheet feeder section 147 also serves to send a sensing signal of the pre-aligning sensor 68 (by which the arrival of a copy sheet P to the register rollers 66 is detected) to the printer CPU 141.

The developing process section 148 electrically charges the photosensitive drum 30, develops an image, and transfers the image to a sheet. The fixing controller 149 controls the fixing unit 58, which fixes an image transferred onto a sheet.

The control panel 90 comprises a panel CPU 151, a start key 152, a liquid crystal display section 153, etc. The panel CPU 151 controls the entirety of the control panel 90. The start key 152 is operated when the copying operation or facsimile transmission is started. The liquid crystal display 153 is a liquid crystal panel incorporating a touch panel 153a.

An image data bus 160 is a line through which image data are transmitted and received. To this image data bus 160, the image processing section 106, the page memory 109, the facsimile communication section 110, the print data reception section 111, the image correction section 134, the LD drive circuit 145, etc. are connected.

A description will now be given of the finisher 80. The finisher 80 includes a finisher CPU 171, a ROM 172, a RAM 173, a bin moving mechanism 174, a stapling mechanism 175, a sheet feed section 176, etc.

The finisher CPU 171 performs mutual communication with reference to the printer CPU 141. When the printer section 6 executes an image forming operation, the finisher CPU 171 supplies the printer CPU 141 with signals regarding the operation of the finisher 80, such as a processing time. The bin moving mechanism 174 is a mechanism for moving the trays 82 and 84. The stapling mechanism 175 drives the stapler 81 before stapling processing is executed. The sheet feed section 176 controls the feeding of the finisher 80.

Figure 3:
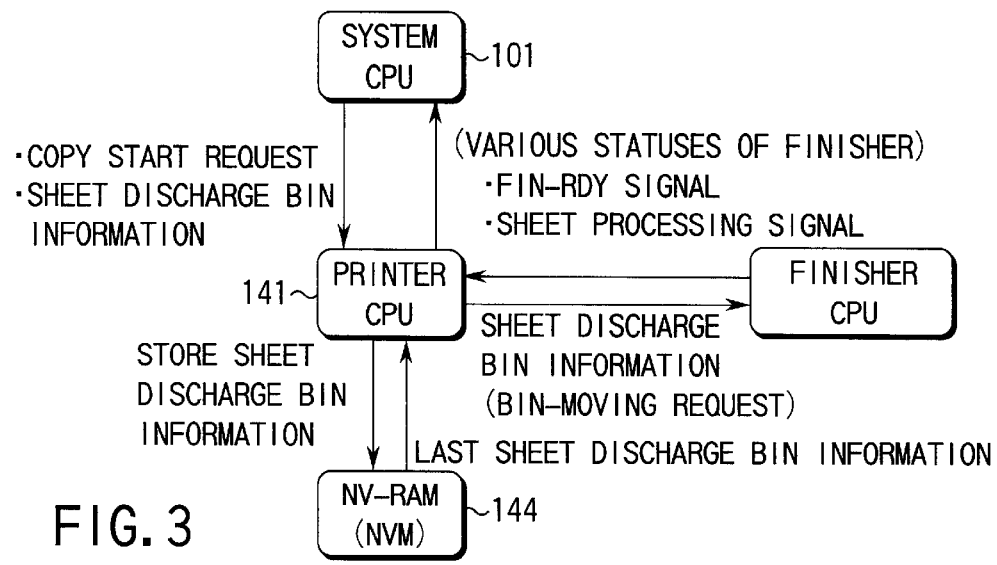
FIG. 3 shows how signals are exchanged between a system CPU, a printer CPU and a finisher CPU.

FIG. 3 shows how signals are exchanged between the system CPU 101, the printer CPU 141 and the finisher CPU 171.

A signal indicating the user's depression of the start button, a printer-mode printing command from a personal computer (not shown), or a start request for starting the printing operation of a facsimile document, is sent from the system CPU 101 to the printer CPU 141. The start request for starting the printing operation includes information regarding a sheet discharge position (discharge bin information), in addition to the information regarding a document size, a sheet feed start position, etc.

Upon receipt of the start request for the printing operation from the system CPU 101, the printer CPU 141 transmits the discharge bin information, a bin-moving request, etc. to the finisher CPU 171.

Upon receipt of the discharge bin information and the bin-moving request from the printer CPU 141, the finisher CPU 171 outputs a signal indicating the bin moving status and a sheet processing time, which is a time required for determining the sheet discharge time, and transmits these to the printer CPU 141. As the bin moving status signal, a signal indicating the ready state of the finisher 80 (an FIN-RDY signal) is transmitted when the sheet discharge bins 82 and 84 have been moved to their target positions. When sheet discharge bins 82 and 84 are still moving, a signal indicating that the finisher 80 is still making preparations (an FIN-BUY signal) is transmitted.

The NVM 144 of the printer section 6 is provided with a storage area 144a for storing sheet discharge bin information. This information represents the bin position to which a sheet is discharged last time. On the basis of the sheet discharge bin information, the printer CPU 141 determines whether or not the sheet discharge bins 82 and 84 of the finisher 80 have been moved.

A description will now be given of the operating timings used in the case where the finisher 80 is used.

Figure 4:
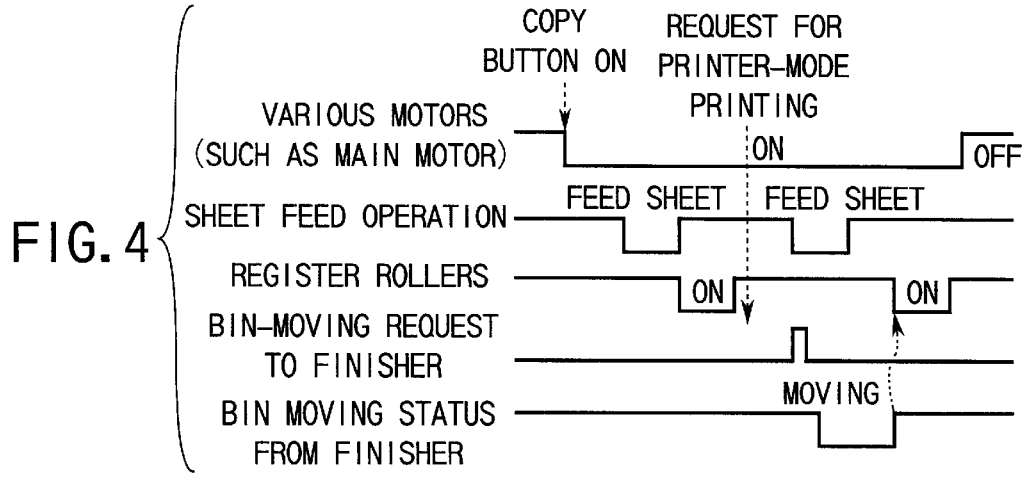
FIG. 4 is a timing chart illustrating the case where motors are kept operated when a finisher is in operation.

FIG. 4 illustrates an example of the conventional control. The Figure is a timing chart illustrating the case where the motors are kept driven when the sheet discharge bins of the finisher 80 are moved. With reference to FIG. 4, a description will be given, by way of example, of the operation that is performed when a request for the printer-mode printing is received.

As shown in FIG. 4, when the start key 152 is depressed, the printer CPU 141 drives a variety of motors, such as the main motor 31. After the rotations of the motors, including the main motor 31, become stable, the printer CPU 141 causes the sheet feeder section 147 to start feeding sheets. The printer CPU 141 stops the sheet feeding operation when the pre-aligning sensor 68 senses a sheet. Then, the printer CPU 141 turns on the register rollers 66 and starts a printing operation.

When a printer-mode printing request is received during this printing operation, the printer CPU 141 registers the requested printer-mode printing as a print job (multi job) that should be executed in succession to the presently-executed printing operation.

When the copying operation comes to an end thereafter, the printer CPU 141 starts the operation for feeding a sheet used for the successively-executed print job, without stopping the motors. The printer CPU 141 transmits sheet discharge bin information and a bin-moving request to the finisher CPU 171. Upon receipt of the sheet discharge bin information and the bin-moving request, the finisher CPU 171 starts moving the sheet discharge bins 82 and 84. When the operation of moving the sheet discharge bins 82 and 84 ends, the finisher CPU 171 sends an FIN-RDY signal to the printer CPU 141.

Upon receipt of the FIN-RDY signal from the finisher CPU 171, the printer CPU 141 turns on the register rollers 66 to start an image forming operation.

When requests for starting a printing operation are made successively, as described above, the sheet feeding operation is repeated without turning off the motors. If the sheet discharge bin in use is switched to another, the time during which the motors are driven in an idle manner is inevitably long.

Figure 5:
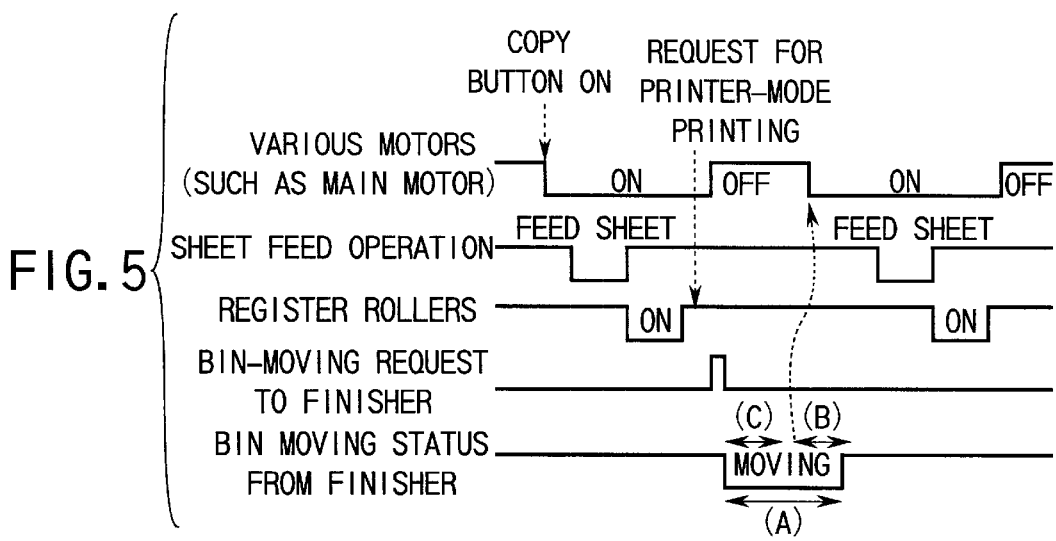
FIG. 5 is a timing chart illustrating the case where the motors are temporarily brought to a halt in accordance with the operation of the finisher.

FIG. 5 illustrates an example of the control according to the present invention. The Figure is a timing chart illustrating the case where the motors are temporarily brought to a halt when the sheet discharge bins of the finisher 80 are being moved. The operation that is performed when a request for the printer-mode printing is received will be described with reference to FIG. 5, as it was with reference to FIG. 4.

As shown in FIG. 5, when a printer-mode printing request is received during the copy-mode printing operation, the printer CPU 141 registers the requested printer-mode printing as a print job (multi job) that should be executed in succession to the presently-executed printing operation.

When the copy-mode printing operation comes to an end thereafter, the printer CPU 141 transmits sheet discharge bin information and a bin-moving request to the finisher CPU 171. In response to this, the finisher CPU 171 sends back a sheet processing time (the first time) to the printer CPU 141.

The sheet processing time is a time which the finisher CPU 171 designates to the printer CPU 141 and which represents the sheet discharge intervals. In other words, the sheet processing time is a time required from the discharge of one sheet to the discharge of the next sheet and thus includes the time needed for the movement of the bins of the finisher.

After transmission of sheet discharge bin information and a bin-moving request, the printer CPU 141 determines the "maximal time required for the motors to be started up" (second time) and the "time required from the time when the feeding of a sheet is started to the time when that sheet reaches the register rollers 66" (third time), on the basis of the motor-starting times predetermined in consideration of their margins.

The printer CPU 141 adds the "maximal time required for the motors to be started up" to the "time required from the time when the feeding of a sheet is started to the time when that sheet reaches the register rollers 66" (the time obtained by this addition will be referred to as "A"). The sum, namely time A, is subtracted from the sheet processing time (which will be referred to as "B"). (The time obtained by this subtraction will be referred to as "C.")

Where $A \geq B$, the printer CPU 141 keeps the motors stationary for time C. Where $A<B$, the printer CPU 141 does not stop the motors and causes them to rotate in an idle manner. The example shown in FIG. 5 is the case where $A \geq B$. When a request for moving the sheet discharge bins is made, the printer CPU 141 temporarily stops the motors. When time C has elapsed after the motors are stopped, the printer CPU 141 drives the motors to start the printing operation.

As described above, the prior art sends a movement request to the finisher when the sheet feeding operation is started, whereas the present invention sends the same request to the finisher in response to reception of a print request from the system CPU. That is, the present invention starts driving the finisher when a start of the copying operation is designated, when a request for printer-mode printing is made, or when a request for facsimile-mode printing is made.

Owing to this feature, the printing processing can be executed at higher speed than the case where a movement command is set to the finisher in synchronism with the start of the sheet feed operation.

The control performed at the start of the printing operation will be described with reference to the flowcharts shown in FIGS. 6 and 7.

When the start key 152 is depressed by the user, the main CPU 101 determines that a copy-mode printing operation has been started. When the start of the printing operation is determined, the system CPU 101 transmits a print start request to the printer CPU 141. This print start request includes information for designating a sheet discharge bin (sheet discharge bin information) or information for designating the operation mode of the finisher, such as a stapling mode or a sorting mode.

In response to the reception of the print start request, the printer CPU 151 locates the present sheet discharge bin, referring to the requested sheet discharge bin information. The printer CPU 141 reads out the last sheet discharge bin position from the storage area 144a of the NVM 144 and determines whether it is different from the present sheet discharge bin position (Step S1).

If this determination shows that the last sheet discharge bin position differs from the present sheet discharge bin position, then the printer CPU 141 transmits sheet discharge bin information to the finisher CPU 171 (Step S2). At the time, the printer CPU 141 updates the sheet discharge bin information stored in the storage area 144a of the NVM (NV-RAM) 144, using the present sheet discharge bin information (Step S3).

Upon receipt of the sheet discharge bin information, the finisher CPU 171 determines the time required for the movement of the sheet discharge bins. On the basis of the time determined time, the finisher CPU 171 determines a time required as the sheet discharge interval (i.e., a sheet processing time). After determining the sheet processing time, the finisher CPU 171 transmits it to the printer CPU 141.

When the sheet processing time is received from the finisher CPU, the printer CPU 141 checks whether the motors are in operation then (Step S5). If the motors are in operation, a check is made to see (Step S6) whether the "sheet processing time" is longer than the sum of the following: the maximal time required for the motors to be started up" and the "time required from the time when the feeding of a sheet is started to the time when that sheet reaches the register rollers."

If this determination shows that the sheet processing time is longer, the printer CPU 141 turns off the motors (Step S7) and transmits a request for moving the bins 82 and 84 to the finisher CPU 171 (Step S8).

In this case, the printer CPU 141 calculates standby time by subtracting the "maximal time required for the motors to be started up" and the "time required from the time when the feeding of a sheet is started to the time when that sheet reaches the register rollers 66" from the "sheet processing time."The printer CPU 141 causes the timer 141a to start time measurement when the motors are turned off and is thus made to stand by for the calculated length of time (Step S9).

When the standby time has elapsed, the printer CPU 141 determines whether or not the motors are being driven (Step S10). If the motors are not being driven, they are turned on (Step S11). The, the printer CPU 141 confirms that preparations have been made for the operation of the finisher 80. For this confirmation, the printer CPU 141 checks whether or not an FIN-RDY signal has been received (Step S12).

The receipt of the FIN-RDY signal represents that the finisher 80 is ready to operate. When this signal is received from the finisher CPU 171, therefore, the printer CPU 141 confirms that the operation of the finisher 80 has come to an end. When an FIN-BUY signal is received from the finisher CPU 171, this means that the finisher 80 is in operation. When this signal is received from the finisher CPU 171, therefore, the printer CPU 141 determines that the finisher 80 is in operation.

In this manner, it is possible to know whether or not the operation of the finisher 80 has been completed by checking the receipt of either the FIN-RDY signal or the FIN-BUY signal from the finisher 171. Hence, a trouble to the main body of the digital copying machine can be prevented even if something is wrong with the finisher.

Upon receipt of the FIN-RDY signal from the finisher CPU 171, the printer CPU 141 causes the sheet feeder section 174 to start a sheet feeding operation (Step S13). During this sheet feeding operation, the printer CPU 141 temporarily stops the sheet immediately before the register rollers 66 and keeps it in the standby state (Step S14). When the sheet feeding operation is completed, the printer CPU 141 drives the register rollers 66 in such a manner that the toner image formed on the photosensitive drum 30 and the feeding timings agree with each other (Step S15).

Accordingly, an image is transferred onto the sheet by the transfer section and is then fixed by the fixing unit 58. The sheet bearing this printed image is discharged to the finisher 80 by the externally transporting mechanism 76. When the sheet is completely discharged onto the finisher 80 (Step S16), the printer CPU 141 checks whether or not the print mode has to be switched to another for the printing operation subsequently executed (Step S17).

When it is determined that the print mode has to be switched, the printer CPU 141 returns to Step S1, and the operation described above is repeated.

When it is determined that the print mode is not to be switched, the printer CPU 141 determines whether a print termination request has been made by the main CPU 101 (Step S18). If this determination shows that there is no print termination request being made, the printer CPU 141 returns to Step S13, and the operation described above is repeated. If the determination shows that there is a print termination request being made, the printer CPU 141 turns off the motors and brings the printing operation to an end.

As described above, the motors are controlled in accordance with the operation time of the finisher and the operation times of the components other than the motors. By this control, unnecessary idle operations of the motors are prevented with no need to lower the operating speed of the printing processing. Hence, the deterioration of the consumables driven by the motor (e.g., the photosensitive drum) is suppressed. In addition, it is possible to shorten the time during which noise is caused by the rotation of the motors.

When the printing operation described above is executed, the main CPU 101 manages the printing processing based on print jobs. Therefore, the printer CPU 141 executes the printing operation in accordance with print job execution requests sent from the main CPU 101.

The print jobs include a single job and a multi job. The single job is a print job that is executed a long interval after the last print request, i.e., a print job that is not successive to the last print job. The multi job is a print job that is executed in succession to the print job being executed, or a print job that is executed, with the presently-executed print job being interrupted.

The printing operation performed based on the single job will be described with reference to the flowcharts shown in FIGS. 6 and 7.

Figure 6:
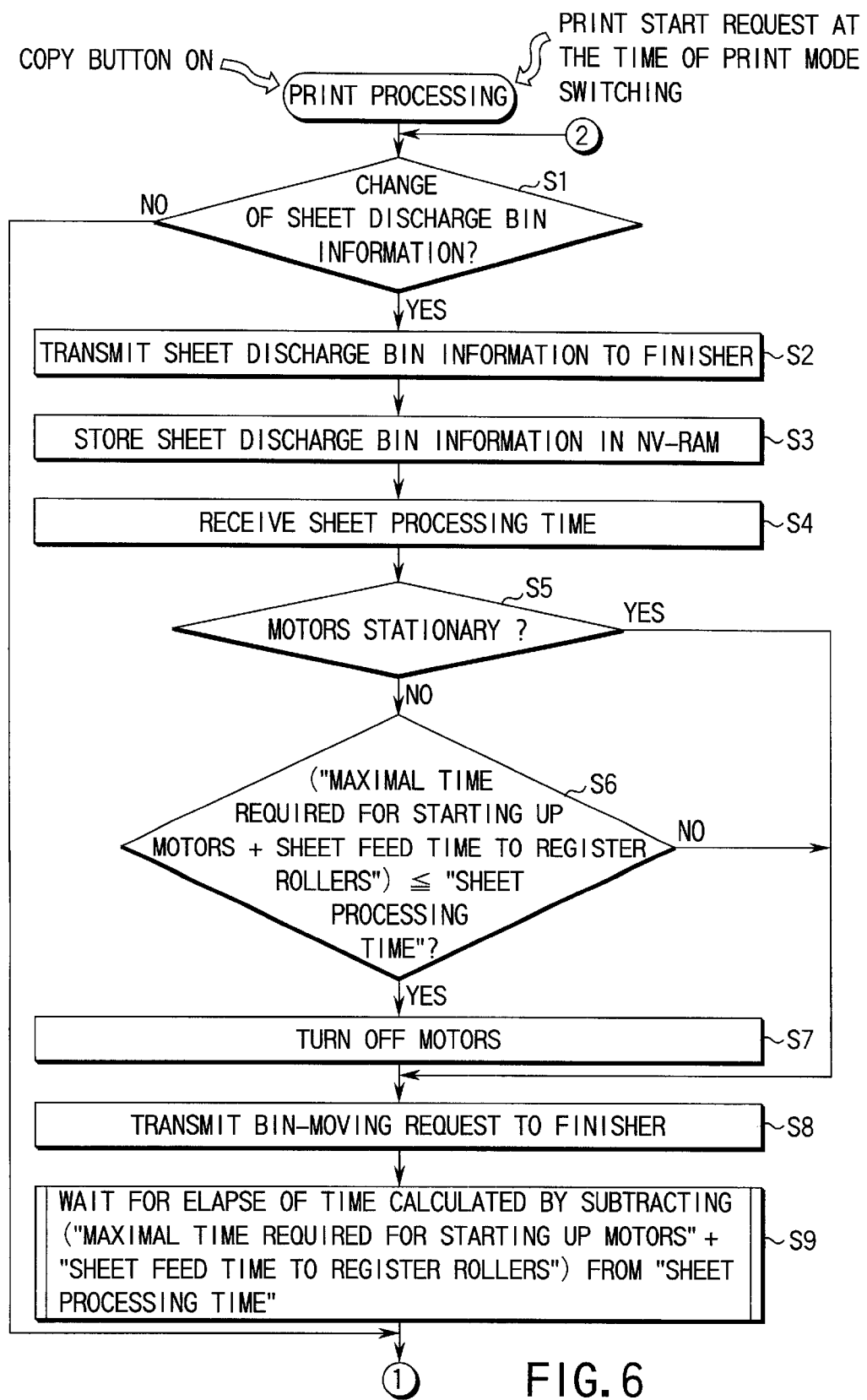
FIG. 6 is a flowchart showing how the digital copying machine performs a printing operation when the finish is coupled to the machine.

In the case of the signal job, the Step S5 shown in FIG. 6 described above is executed at the start of the print job. That is, the motors are determined as being stationary, and thereafter control advantages to Step S8. In this manner, the processing in Steps S6 and S7 is omitted.

The motors are turned on when a certain length of time has elapsed from the transmission of a bin-moving request to the finisher CPU 172. The certain length of time being the time obtained by subtracting the "maximal time required for the motors to be started up" and the "time required from the time when the feeding of a sheet is started to the time when that sheet reaches the register rollers 66" from the "sheet processing time."

In this manner, the motors do not rotate in vain when first copies are made. The consumables are expected to have a long life without any decrease in the speed of the printing operation.

The printing operation performed based on the multi job will be described with reference to the flowcharts shown in FIGS. 6 and 7.

Figure 7:
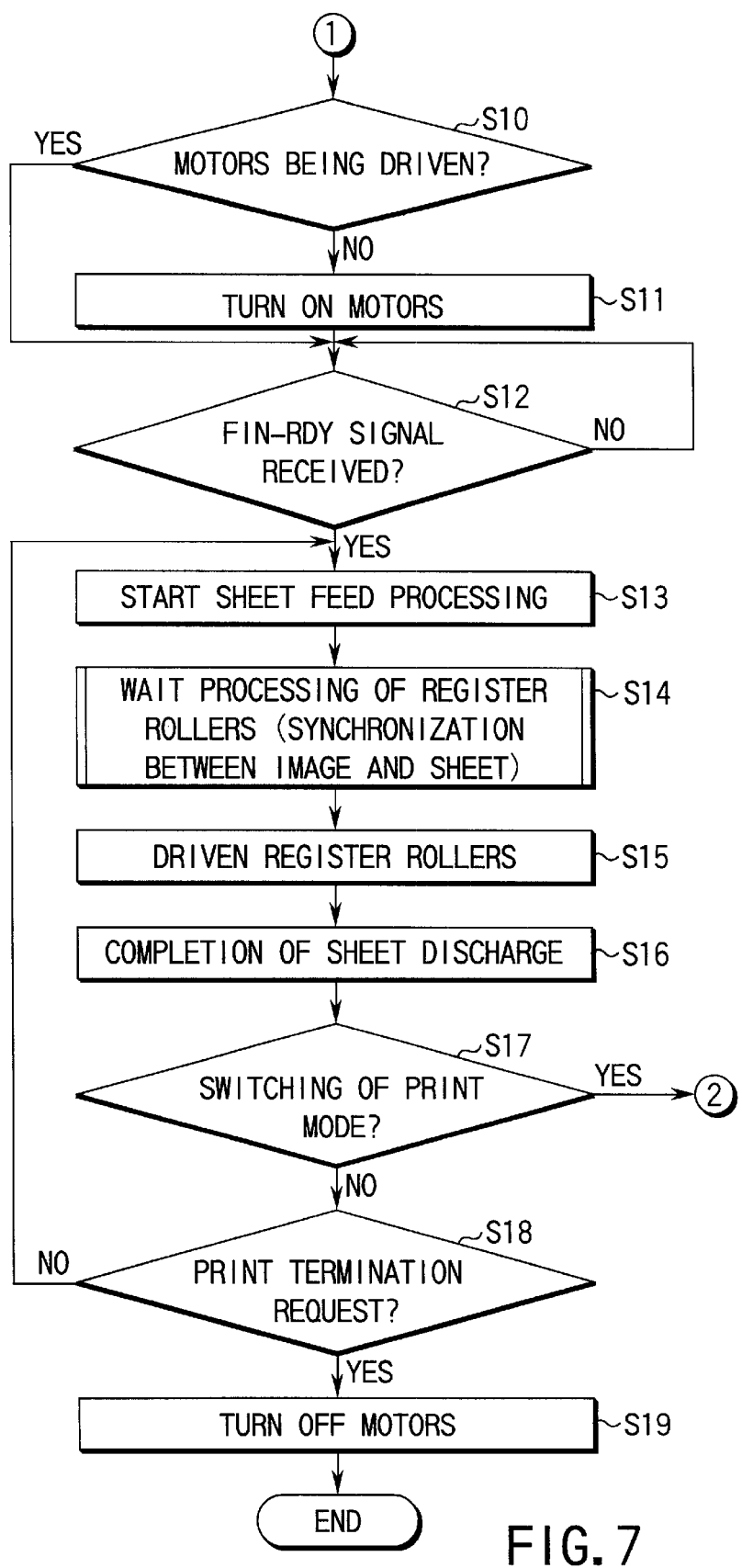
FIG. 7 is also a flowchart showing how the digital copying machine performs a printing operation when the finisher is coupled to the machine.

In the case of the multi job, the Step S17 shown in FIG. 7 described above is executed when the processing moves on to the next print job. That is, it is determined that the print mode has to be switched, and the processing advances to Step S1. When, in this step, it is determined that there has been a change in the sheet discharge bin information, the processing illustrated in Steps S2–S4 is executed. In Step S5, thereafter, the motors are determined as being in operation, and the processing advances to Step S6.

In this Step S6, the "sheet processing time" (A) is compared with the sum (B) of the "maximal time required for the motors to be started up" and the "time required from the time when the feeding of a sheet is started to the time when that sheet reaches the register rollers." Where the latter is smaller, namely, (A)≧(B), the motors are temporarily brought to a halt, and a bin-moving request is transmitted to the finisher CPU 171.

Where the sum (B) of the "maximal time required for the motors to be started up" and the "time required from the time when the feeding of a sheet is started to the time when that sheet reaches the register rollers" is greater than the "sheet processing time" (A), namely, where (A)<(B), the motors are not stopped and are kept rotating in an idle manner. In this state, a bin-moving request is transmitted to the finisher CPU 171.

Owing to this control, the multi job can be executed with high efficiency. That is, when the sheet processing time is shorter than the sum of the motor startup time and the sheet feed time, the motor need not be temporarily stopped, and a high-efficient operation is thus enabled.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image forming apparatus comprising:
   sheet feed means for feeding an image formation medium;
   image forming means for forming an image on the image formation medium fed by the sheet feed means;
   discharge means for discharging the image formation medium on which the image is formed by the image forming means; and
   control means for controlling timings at which an operation of the image forming means is started, when image formation processing is executed by the image forming means, in such a manner that the timing are controlled in accordance with a first time required for the discharge means to complete and operation and a time required for starting up the image forming means.

2. An image forming apparatus according to claim 1, wherein said control means controls the timings at which the operation of the image forming means is started, in accordance with said first time, said second time, and a third time required for the sheet feed means to complete a sheet feeding operation.

3. An image forming apparatus according to claim 1, wherein said control means delays the timings at which the operation of the image forming means is started, by a time that is obtained by subtracting the second time and a third time from the first time, said third time being a time required for the sheet feed means to complete a sheet feeding operation.

4. An image forming apparatus according to claim 1, further comprising determination means for determining whether or not said first time is longer than a sum of the second time and a third time that is required for the sheet feed means to complete a sheet feeding operation,
   wherein, when said determination means determines that the first time is longer than the sum of the second and third times, said control means delays the timings at which the operation of the image forming means is started, by a time that is obtained by subtracting the second time and the third time from the first time.

5. An image forming apparatus comprising:
   sheet feed means for feeding an image formation medium;
   image forming means for forming an image on the image formation medium fed by the sheet feed means;
   discharge means including a plurality of sheet discharge bins to which the image formation medium bearing the image formed by the image forming means is selectively discharged on the basis of settings regarding image formation processing;
   determination means for determining whether or not the sheet discharge bins to which image formation medium is discharged are switched form one to another, when the image formation processing is executed by the image forming means; and
   control means for controlling timing at which an operation of the image forming means is started, in such a manner that the timings are controlled in accordance with a first time, a second time and a third time when the determination means determines that the sheet discharge bins are switched from one to another, said first time being a time required for the discharge means to switch the sheet discharge bins, said second time being a time required for starting up the image forming means, and said third time being a time required for the sheet feed means to feed the image formation medium.

6. An image forming apparatus according to claim 5, wherein said discharge means starts switching of the sheet discharging bins when a request for image forming processing is made.

7. An image forming apparatus according to claim 5, further comprising storage means for storing information representing to a sheet discharge bin onto which the image formation medium is discharged, and said determination means determining whether or not a sheet discharge bin used in image formation processing to be executed is different from the sheet discharge bin represented by the information stored in the storage means.

8. An image forming apparatus according to claim 5, further comprising second determination means for determining whether or not said first time is longer than a sum of the second and third times, when the determination means determines that the sheet discharge bins are switched from one to another, wherein, when said second determination means determines that the first time is longer than the sum of the second and third times, said control means delays the timings at which the operation of the image forming means is started, by a time that is obtained by subtracting the second time and the third time from the first time.

9. An image forming method which is for use in an image forming apparatus comprising the steps:

providing an image formation medium;

forming an image on the image formation medium on which the image forming means; and p1 discharging the image formation medium on which the image is formed, wherein the step of forming an image is controlled in accordance with a first time required for the step of discharging the image formation medium to be completed and a second time required for starting up the image forming means.

10. An image forming method according to claim 9, wherein the timings at which the step of forming an image is started are controlled in accordance with said first time, said second time, and a third time required to complete the step of providing an image formation medium.

11. An image forming method according to claim 9, wherein the timings at which the step of forming an image is started are delayed by a time that is obtained by subtracting the second time and a third time from the first time, said third time being a time required to complete the step of providing an image formation medium.

12. An image forming method according to claim 9, wherein a determination is made to see whether or not said first time is longer than a sum of the second time and a third time that is required to complete the step of providing an image formation medium, wherein, when said determination shows that the first time is longer than the sum of the second and third times, the timings at which the step of providing an image formation medium is started are delayed by a time that is obtained by subtracting the second time and the third time from the first time.

\* \* \* \* \*